United States Patent
Ablabutyan et al.

(10) Patent No.: US 6,948,903 B2
(45) Date of Patent: Sep. 27, 2005

(54) UNITARY LIFTGATE

(75) Inventors: Karapet Ablabutyan, Glendale, CA (US); Paul Bark, Canyon Lake, CA (US)

(73) Assignee: Maxon Lift Corporation, Sante Fe, CA (US)

( * ) Notice: Subject to any disclaimer, the term of this patent is extended or adjusted under 35 U.S.C. 154(b) by 0 days.

(21) Appl. No.: 09/811,237

(22) Filed: Mar. 15, 2001

(65) Prior Publication Data

US 2002/0182045 A1 Dec. 5, 2002

(51) Int. Cl.$^7$ .................................................. B60P 1/44
(52) U.S. Cl. ...................... 414/557; 414/545; 414/558
(58) Field of Search ................................ 414/545, 556, 414/557, 558; 296/60, 62; 293/136

(56) References Cited

U.S. PATENT DOCUMENTS

| | | | | | |
|---|---|---|---|---|---|
| 2,732,960 | A | * | 1/1956 | Nilson | .......................... 414/549 |
| 3,351,220 | A | * | 11/1967 | Kirkbride | .................... 187/245 |
| 3,637,097 | A | * | 1/1972 | Horowitz | ..................... 414/557 |
| 3,700,123 | A | * | 10/1972 | Corley, Jr. | |
| 3,779,406 | A | * | 12/1973 | Hermann | ..................... 414/537 |
| 3,889,827 | A | * | 6/1975 | Fine | .............................. 296/61 |

(Continued)

FOREIGN PATENT DOCUMENTS

| | | |
|---|---|---|
| DE | 35 31 853 A1 | 3/1987 |
| DE | 37 39 267 A1 | 1/1989 |
| EP | 0 217 467 A1 | 4/1987 |
| EP | 0 774 243 A2 | 5/1997 |
| EP | 0 003 950 A2 | 9/1997 |
| EP | 0 774 243 A3 | 11/1997 |
| FR | 2 537 121 | 6/1984 |
| GB | 1 198 184 | 7/1970 |
| GB | 2107671 | * 5/1983 | .................. 414/558 |
| GB | 2190649 | * 11/1987 | .................. 414/558 |
| WO | WO 80/02538 | 11/1980 |
| WO | WO 88/03484 | 5/1988 |
| WO | WO 90/05072 | 5/1990 |
| WO | WO 92/14431 | 9/1992 |
| WO | WO 94/27546 | 12/1994 |
| WO | WO 02/074580 A1 | 9/2002 |

OTHER PUBLICATIONS

Maxon Specifications Conventional Model: P–1000 Pick–Up Series Standard Ride—M113–10978.

Maxon Specifications Railift Lift Gates Models: RC–2, RC–3, RC–4, RC–5, RC–6 Railift Gates—M100–0499.

(Continued)

*Primary Examiner*—James W. Keenan

(57) ABSTRACT

The invention is a unitary cantilever liftgate that attaches to the vehicle body instead of the vehicle chassis. The liftgate may be fully assembled and tested prior to installation on the vehicle body. This greatly reduces installation time while improving performance and reliability. Various features such as steps, bumpers and brackets are integrated into the liftgate. Further, the liftgate is preferably configured so that multiple units can be stacked together for shipping and ease of unloading and loading. The stackability of the liftgates simplifies storing as well, by removing the necessity of storing several components separately.

10 Claims, 7 Drawing Sheets

U.S. PATENT DOCUMENTS

| | | | |
|---|---|---|---|
| 3,957,284 A | | 5/1976 | Wright |
| 4,027,807 A | | 6/1977 | Thorley |
| 4,058,228 A | | 11/1977 | Hall |
| 4,078,676 A | * | 3/1978 | Mortenson ................ 414/558 |
| 4,081,091 A | | 3/1978 | Thorley |
| 4,134,504 A | | 1/1979 | Salas et al. |
| 4,164,292 A | | 8/1979 | Karkau |
| 4,168,134 A | | 9/1979 | Pohl |
| 4,176,999 A | | 12/1979 | Thorley |
| 4,180,366 A | | 12/1979 | Roth et al. |
| 4,273,217 A | * | 6/1981 | Kajita ........................ 187/200 |
| 4,285,416 A | | 8/1981 | Dudynsky |
| 4,353,436 A | | 10/1982 | Rice et al. |
| 4,474,527 A | | 10/1984 | Risner et al. |
| 4,479,753 A | | 10/1984 | Thorley |
| 4,534,450 A | | 8/1985 | Savaria |
| 4,671,387 A | | 6/1987 | Bourgeois |
| 4,685,860 A | | 8/1987 | McFarland |
| 4,813,842 A | * | 3/1989 | Morton ................ 292/DIG. 29 |
| 5,149,246 A | | 9/1992 | Dorn |
| 5,261,779 A | | 11/1993 | Goodrich |
| 5,513,943 A | * | 5/1996 | Lugash et al. ............. 187/244 |
| 5,556,250 A | | 9/1996 | Fretwell et al. |
| 5,605,431 A | | 2/1997 | Saucier et al. |
| 5,641,262 A | * | 6/1997 | Dunlop et al. ............ 254/10 R |
| 5,672,041 A | | 9/1997 | Ringdahl et al. |
| 5,806,632 A | | 9/1998 | Budd et al. |
| 5,944,473 A | | 8/1999 | Saucier et al. |
| 6,039,528 A | | 3/2000 | Cohn |
| 6,062,805 A | | 5/2000 | Tremblay et al. |
| 6,238,169 B1 | | 5/2001 | Dupuy et al. |
| 6,464,447 B2 | | 10/2002 | Dupuy et al. |
| 6,705,825 B2 | * | 3/2004 | Kreutinger ................ 414/557 |

OTHER PUBLICATIONS

Maxon Specifications Columnlift Lift Gates Models: BMR–35, BMR–44, BMR–55, BMR–66 Extra Heavy Duty Series Full Hydraulic Operation Low Profile, Level Ride—M120–697.

Maxon Specifications Tuk–a–way LMRO Series Liftgates Models: 72–25 & 72–30LMRO Ideal for Truck Rental & Leasing Companies: Walk Ramp Ready; Wide arm, low Maintenance Standard Ride; Integrated Switch & Harness Assembly; for General Purpose Freight Applications—M138–0300.

Maxon Specifications Tuk–a–way Liftgate Series Models: 72–25LMV & 72–30LMV Wide–arm, low Maintenance; General Purpose Freight Applications; Standard Ride M137–0999.

Maxon Liftgates—Established 1957—Product Line.

Maxon Lift Corp. Installation Manual Tuk–a–way Liftgate Series 72–25(B & IM)–72–30(B & LM) M–91–08—Rev. 6, Mar. 1999.

* cited by examiner

UNITARY LIFTGATE

BACKGROUND OF THE INVENTION

1. Field of the Invention

The present invention relates to liftgates used to bring loads to and from ground level and the level of a vehicle's payload area.

2. Description of the Related Art

Liftgates are typically mounted at the rear of trucks, truck trailers and the like to bring payloads from ground level up to the bed of the truck or from the bed to the ground. In some applications, it is desirable to configure the liftgate so that it folds away when not in use. Examples of such designs are the cantilever Tuk-A-Way® liftgates available from Maxon (Santa Fe Springs, Calif.), assignee of the current invention. Typically, these liftgates employ parallelogram linkages to maintain the liftgate in a horizontal plane through the lifting range. The liftgate is attached to the parallelogram linkages by pivot members, which allow the liftgate to be placed in a generally vertical position when in the lowered position. When in the vertical position, operation of the lifting mechanism rotates the liftgate into an inverted, stowed position beneath the vehicle body.

Prior art Tuk type cantilever liftgates present various challenges having to do with their shipping and installation. All prior art Tuk type cantilever liftgates mount to the vehicle chassis. Thus, these liftgates are susceptible to misalignment with the vehicle body. When misaligned, operation of the liftgate can exert differential force on the vehicle body and truck body, tending to separate them. Further, typical cantilever liftgates, when shipped from the factory, are partially disassembled and have awkward shapes, requiring substantial packaging. Further, proper installation necessitates that several of the components must be precisely aligned and then securely mounted to the vehicle. Moreover, the liftgate must be fitted to the vehicle only after the truck body has been attached to the chassis. Consequently, proper installation of prior art liftgates involve significant time and expense.

Accordingly, what has been needed is a Tuk type cantilever liftgate design configured for easy shipping that simplifies installation while improving overall strength and reliability. This invention satisfies these and other needs.

SUMMARY OF THE INVENTION

The system of the invention is a pre-assembled, unitary Tuk type cantilever liftgate comprising an opposing pair of side plates, an extension plate extending between the side plates, a hydraulically driven lift frame pivotally attached to the side plates and a liftgate platform rotatably attached to the lift frame wherein the liftgate is configured to be secured only to a vehicle body. In preferred embodiments, the side plates and extension plate are configured so that liftgate system can be attached to the vehicle body by bolts, welding or the like. The side plates may further comprise steps, brackets and bumpers. Also preferably, the lift frame may comprise a lift frame tube configured to function as an underride guard. The unitary liftgate may also be configured to allow multiple units to be stacked together to facilitate shipping and storage.

The invention also comprises the unitary liftgate system secured to a vehicle body. This lift gate may be fully assembled and tested prior to being secured to the vehicle body. Further, since the liftgate is secured to the vehicle body, it can be attached prior to the body being secured to the vehicle chassis. The features of the invention allow the liftgate to be installed in significantly less time than prior art cantilever liftgates.

BRIEF DESCRIPTION OF THE DRAWINGS

The aforementioned advantages of the invention, as well as additional advantages thereof, will be more fully understood in light of the detailed description of the invention below when taken in conjunction with the accompanying drawings in which.

DETAILED DESCRIPTION OF THE INVENTION

Figure 1:
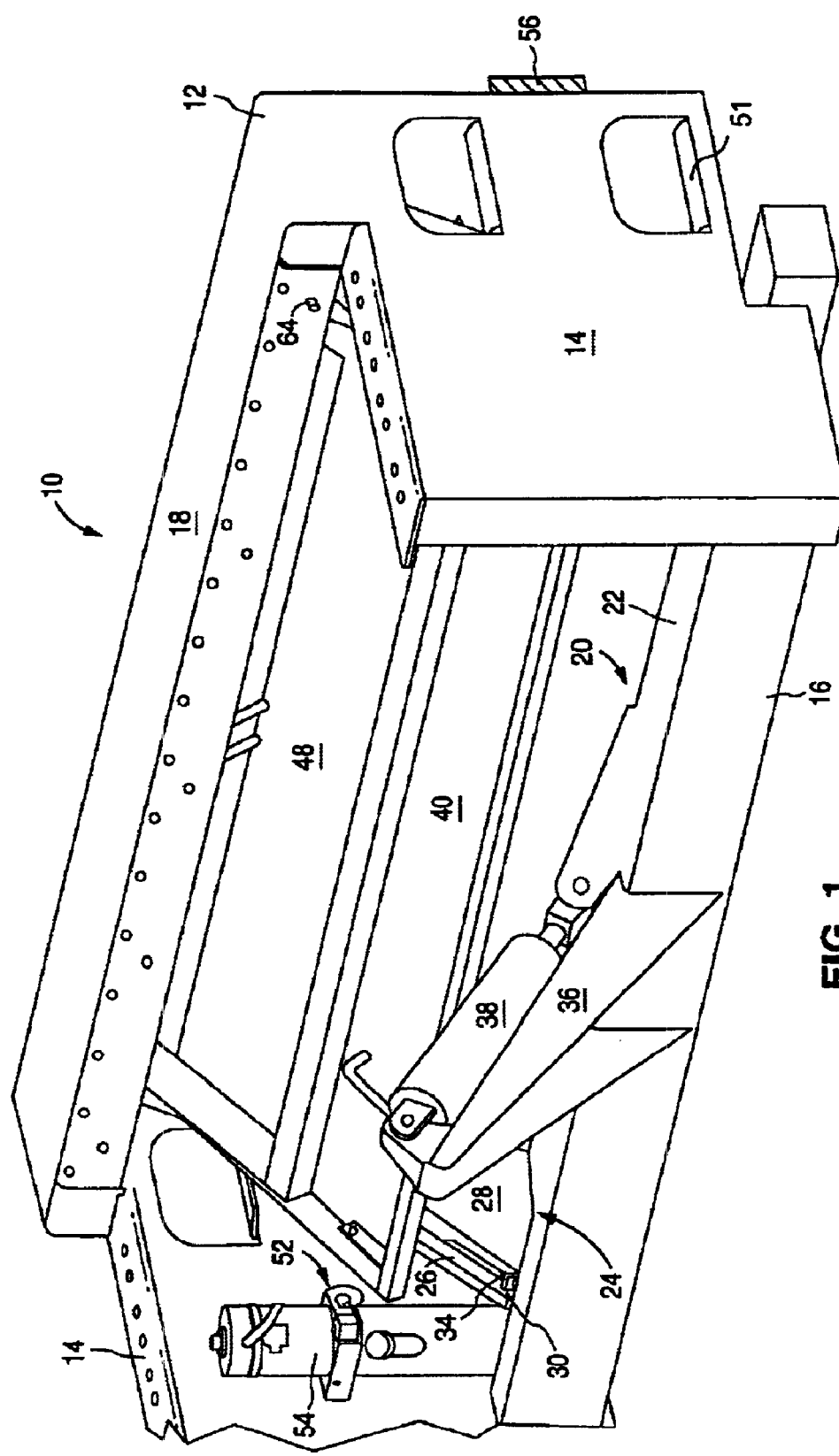
FIG. 1 is an elevational view of the inventive liftgate shown with the liftgate platform in the stowed position.
Figure 2:
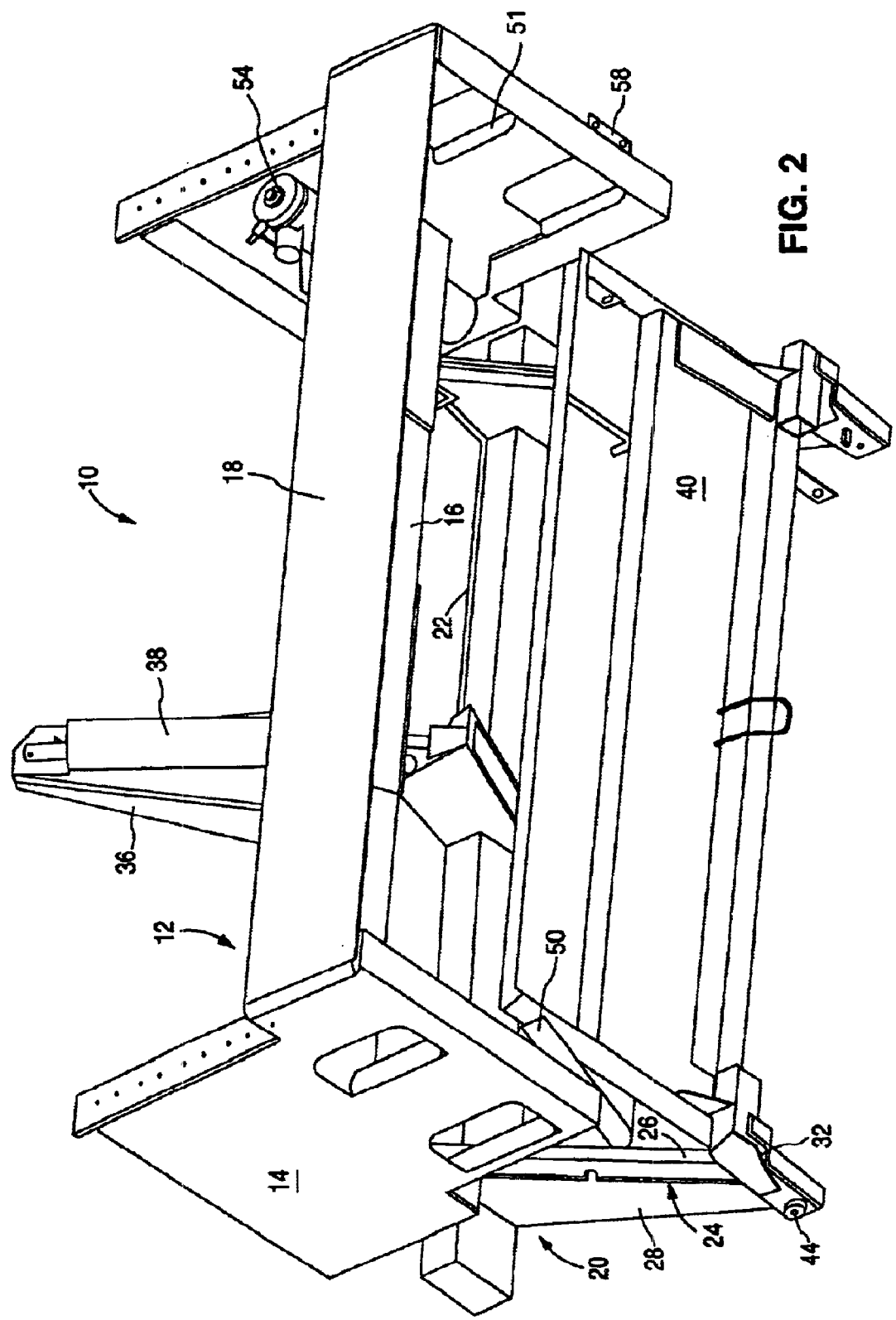
FIG. 2 is an elevational view of the liftgate platform lowered to the vertical position.
Figure 3:
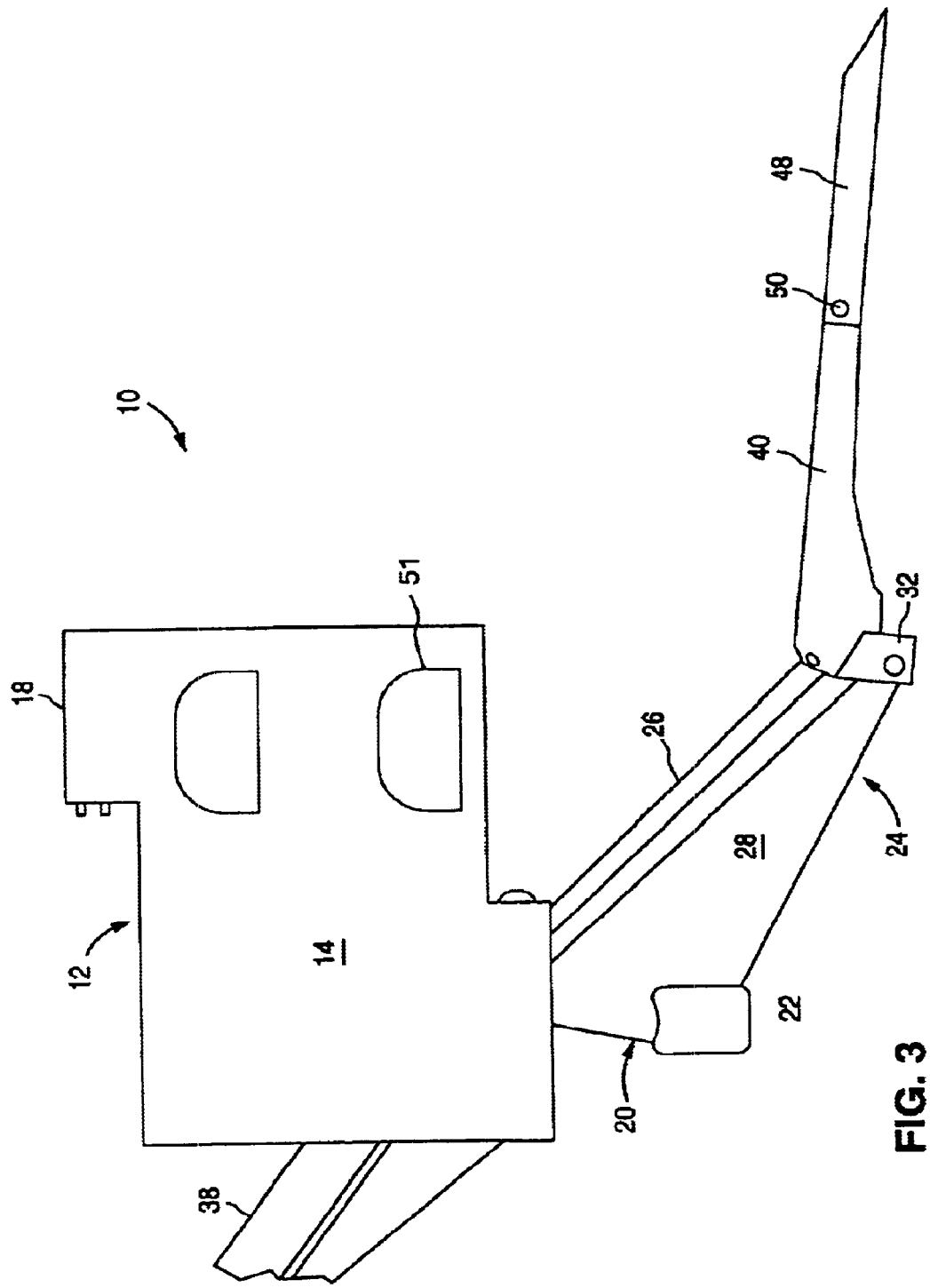
FIG. 3 is a side view of the liftgate platform in the lowered position with the liftgate platform extended.

FIGS. 1–7 show the cantilever liftgate system 10 of the invention. The system comprises a framework 12 having side plates 14, a trunnion tube 16 extending between side plates 14 and an extension plate 18, also extending between side plates 14. The structural members of liftgate 10 are preferably formed from steel, but other metals or composite materials can be suitable depending upon the intended application. The liftgate also comprises a lift frame 20 with a lift frame tube 22 extending between an opposing pair of parallelogram linkages 24 each having upper arms 26 and lower arms 28 with and proximal pivot members 30 and distal pivot members 32. Proximal pivot members 30 are attached to trunnion tube 16 thus securing lift frame 20 to framework 12. Preferably, trunnion tube 16 comprises integral mounts 34 for attaching proximal pivot members 30. Trunnion tube 16 also comprises cylinder tower 36. Hydraulic cylinder 38 is pivotally attached at either end to tower 36 and lift frame tube 22 to drive lift frame 20. Distal pivot members 32 are secured to liftgate platform 40 so that, together with proximal pivot members 30, upper and lower arms 26 and 28 form parallelogram linkages 24. The linkages 24 are configured to maintain the orientation of distal pivot members 32 to proximal pivot members 30 as upper arms 26 and lower arms 28 are raised and lowered. Retraction of hydraulic cylinder 38 drives lift frame tube 22, rotating upper arms 26 and lower arms 28 about proximal pivot members 30 to lower liftgate platform 40. Conversely, extension of hydraulic cylinder 38 raises liftgate platform 40.

Figure 4:
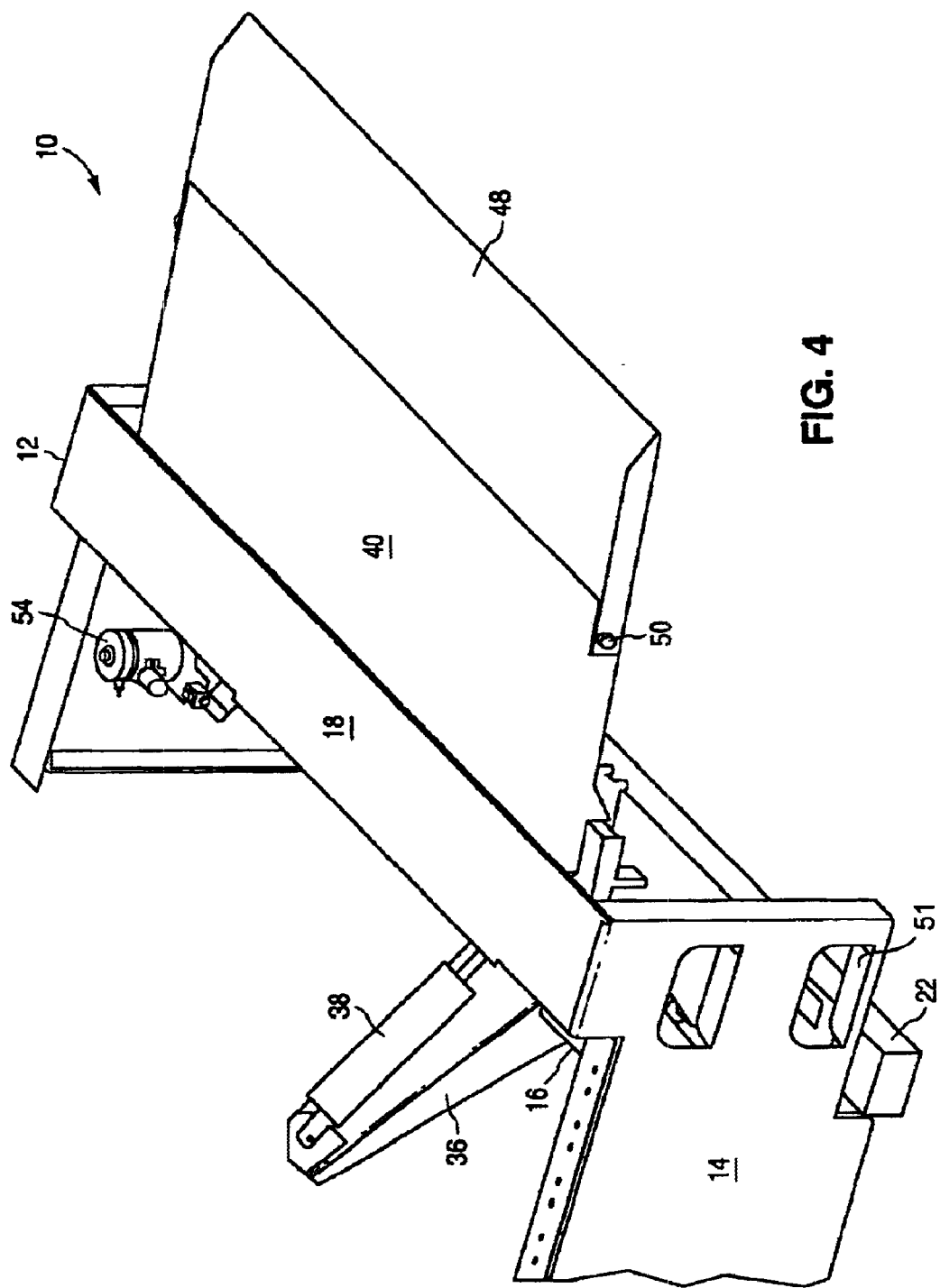
FIG. 4 is an elevational view of the liftgate platform in the raised position with the liftgate platform extended.
Figure 5:
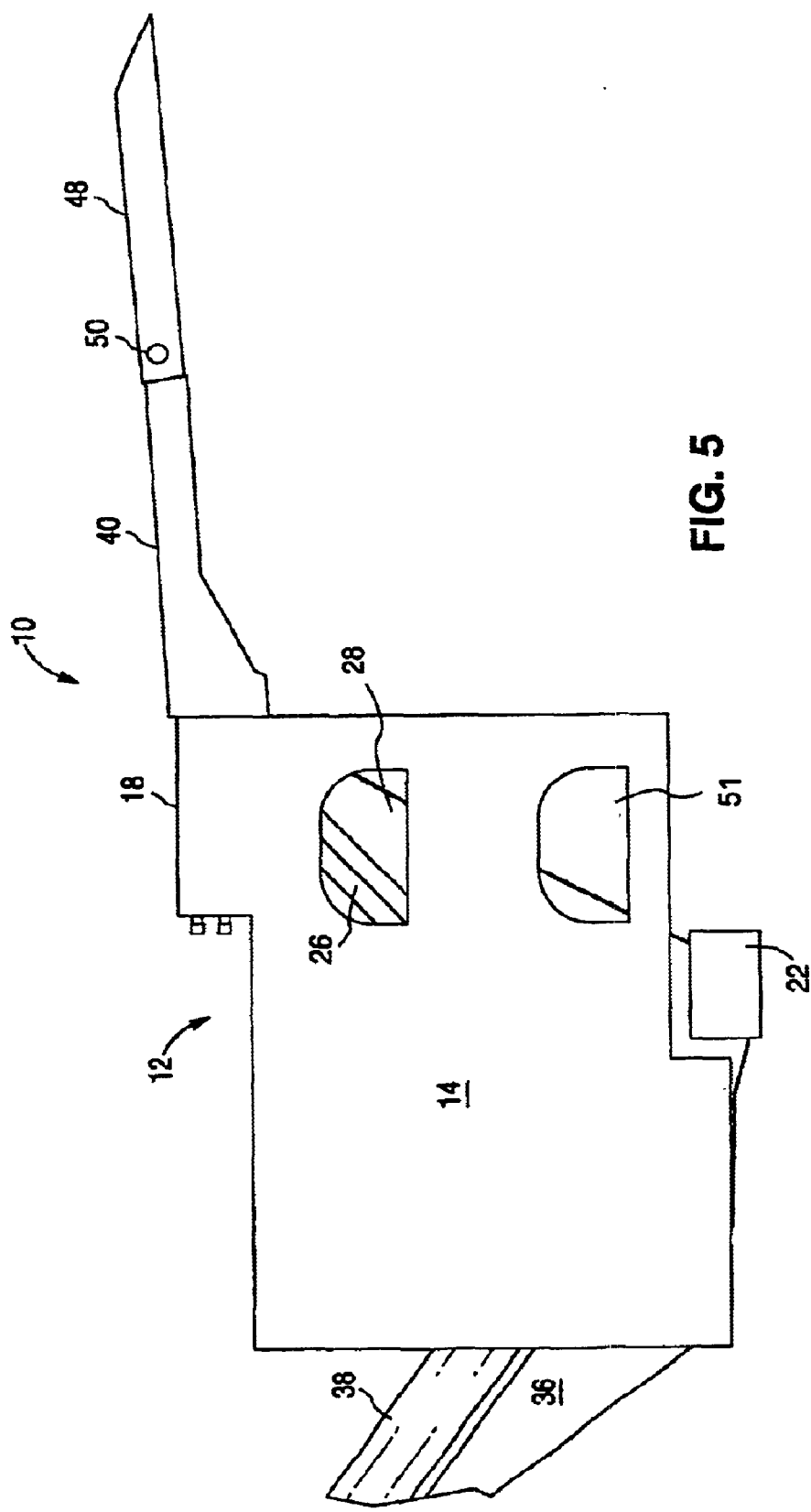
FIG. 5 is a side view of the liftgate in the raised position with the liftgate platform extended.
Figure 6:
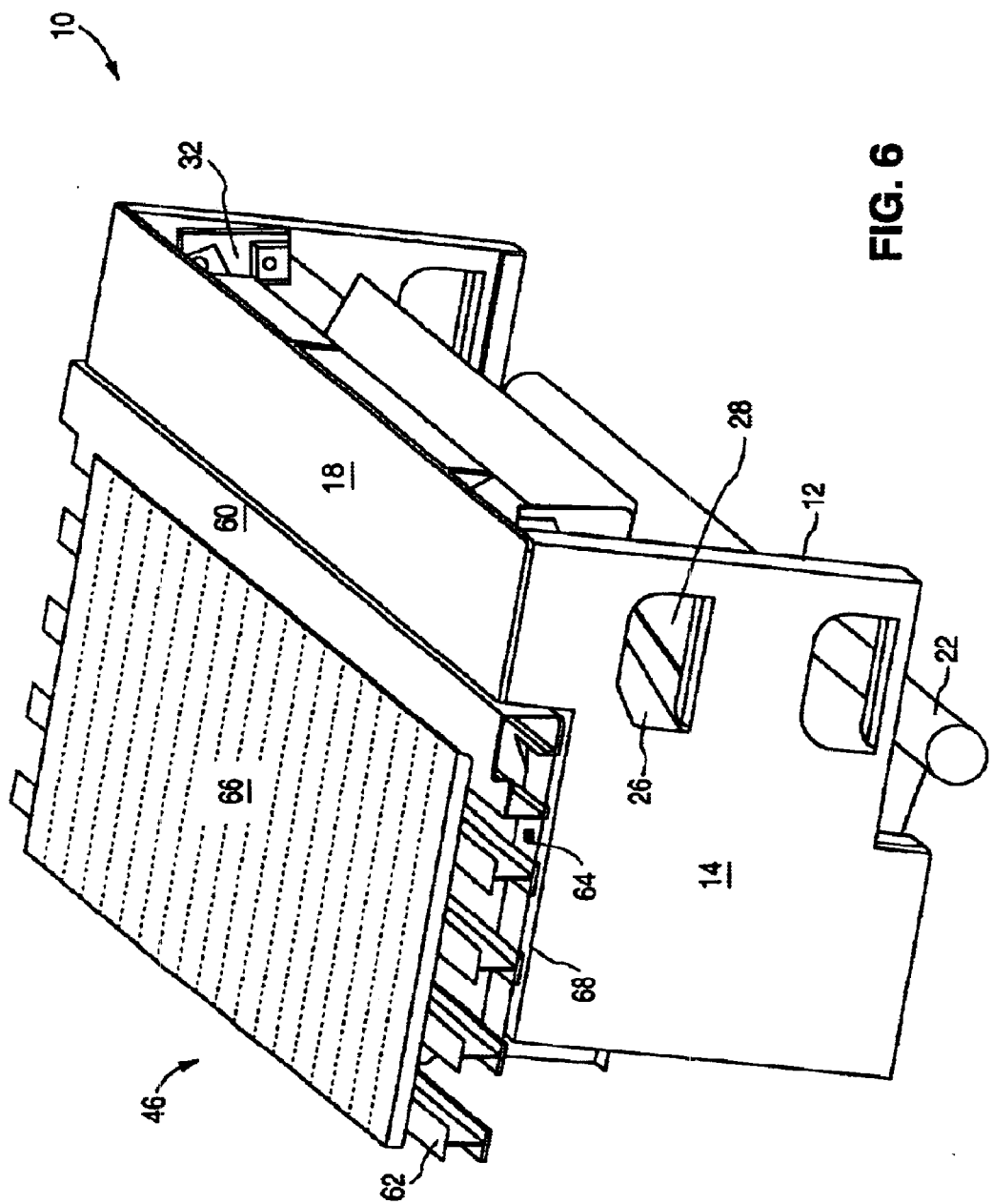
FIG. 6 is an elevational view showing the liftgate platform secured to a portion of the vehicle body.

Liftgate platform 40 is configured to be raised into either the load lifting position shown in FIGS. 4 and 5 or the stowed position shown in FIGS. 1 and 6. Specifically, liftgate platform 40 is rotatably attached to distal pivot members 32 with motion limiting stops 44 that prevent rotation of liftgate platform 40 away from upper and lower arms 26 and 28 beyond the horizontal plane. This keeps liftgate platform 40 in a plane parallel with the ground and vehicle body 46 to facilitate loading and unloading. Alternatively, liftgate platform 40 may be rotated at distal pivot members 32 toward upper and lower arms 26 and 28 to the generally vertical position shown in FIG. 2. In this position, actuation of hydraulic cylinder 38 raises and inverts liftgate platform 40 until it is located in its stowed position shown in FIGS. 1 and 6. As used herein, the term cantilever refers to liftgates having a platform supported at one end only. For example, platform 40 is supported by the pivotal attachment to distal pivot members 32.

In a preferred embodiment, liftgate platform 40 is equipped with a liftgate platform extension 48 attached by hinge 50, creating a bifold configuration. Hinge 50 allows the liftgate platform extension to fold against liftgate platform 40 in the direction of the system 10, but prevents liftgate platform extension 48 from rotating beyond the plane of liftgate platform 40, thus providing a suitable lifting platform. Similarly, when liftgate platform 40 is placed into the vertical position shown in FIG. 2, liftgate platform extension 48 folds back against liftgate platform 40, providing a more compact profile for storage. In other embodiments, one or more additional platform extensions may be provided creating a trifold configuration, for example.

Framework 12 preferably comprises a variety of additional features to simplify manufacture and to increase the utility of the liftgate system 10. For example, side plates 14 may comprise formed steps 51, pump bracket 52 for mounting pump 54 to power hydraulic cylinder 38, dock bumpers 56 and vehicle light brackets 58. Generally, these features are integral with the framework 12 but they can also be separate members that are suitably attached to the frame. Also preferably, lift frame tube 22 is configured to function as an underride guard to minimize injury in the event of a rear end collision. Integrating underride protection into the existing liftgate system removes the need for an additional, dedicated horizontal member.

FIG. 6 shows framework 12 secured to vehicle body 46. Generally, extension plate 18 is secured to the rear lower horizontal frame member 60 of the vehicle and side plates 14 are secured to the rear lower horizontal frame member 60 and sub-structure cross members 62. Preferably, framework 12 is secured to the vehicle by bolts 64, but welding or other conventional means of attachment are also suitable. Since all the liftgate components are attached to the framework 12, only the framework 12 needs to be attached to the vehicle and no alignment or adjustment of the lifting mechanism will be necessary. Further, the unitary construction of the liftgate allows it to be attached to a wide variety of truck types, since only the framework 12 need be secured. Typically, the only adjustment necessary is to level the extension plate 18 with the truck bed 66. This is easily accomplished by the use of shims 68 between side plates 14 and cross members 62. In short, this invention allows the integrated liftgate system 10 to be fully pre-assembled requiring only final bolt-on attachment to a vehicle body with little or no adjustment.

As an alternative embodiment framework 12 can be preattached to lower horizontal frame member 60 at the factory and shipped as a unitary lift assembly. In such an instance the framework 12, including lower horizontal frame member 60, would be attached on site to the rear of the vehicle by attaching sub-structure cross members 62.

Figure 7:
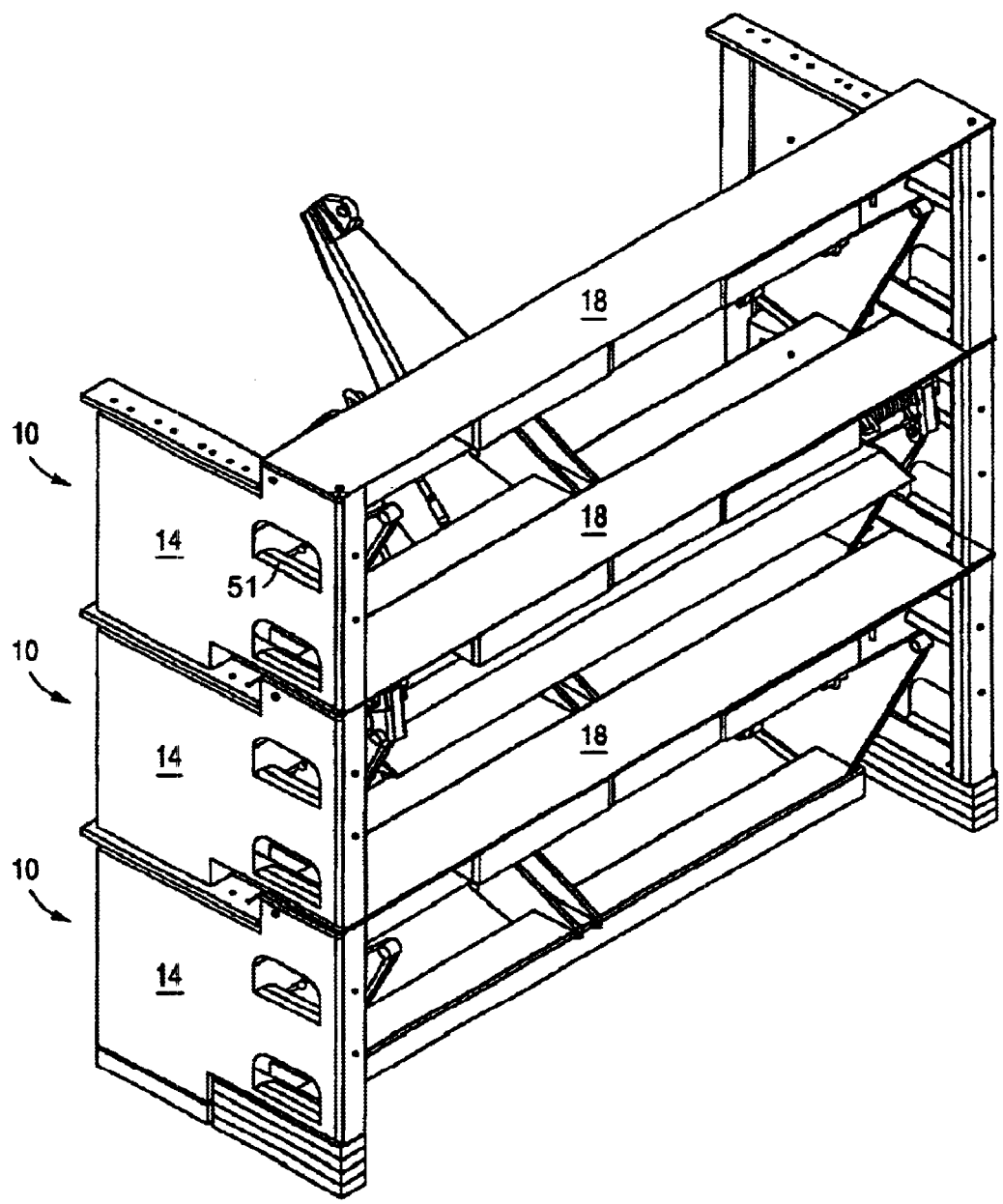
FIG. 7 is an elevational view showing a plurality of inventive unitary, fully assembled liftgates stacked together to facilitate shipping, for example.

The integrated, unitary and compact nature of the invention also facilitates shipping, packaging and storing. Framework 12 with the liftgate platform 40 in the stowed position presents a compact, box-like profile that may be stored or shipped with virtually no packaging. Further, multiple systems may be stacked and bolted together for shipment, avoiding or minimizing the need to use pallets, banding material, or other packaging means. For example, as shown in FIG. 7, the bottom profile of the side plates 14 is configured to nest with the top profile of side plates 14 and extension plate 18. This allows a stack of multiple liftgate units to be very stable and allows them to be easily secured together, by bolts or other suitable means.

Providing a unitary cantilever liftgate that attaches to the vehicle body rather than the vehicle chassis offers numerous benefits. First, the liftgate may be completely assembled and fully tested at the factory prior to being delivered for installment. This greatly improves quality control and simplifies installation. The liftgate need only be secured to the vehicle body by welding, bolting or other means, dramatically reducing the installation time required. Where prior art cantilever liftgates typically require 6 to 8 hours to install, the unitary liftgates of the invention can be installed in about 1 hour. Further, since the liftgates of the invention secure to the vehicle body, the lift platform will always be in alignment with the body. Prior art liftgate designs, since they attach to the vehicle chassis, have lift platforms that may become misaligned with the vehicle body. Indeed, when the misalignment becomes severe, operation of the liftgate can exert a differential force on the vehicle body, causing it to separate from the vehicle chassis. In contrast, the inventive liftgates completely avoid such problems.

Described herein is a preferred embodiment, however, one skilled in the art that pertains to the present invention will understand that there are equivalent alternative embodiments.

What is claimed is:

1. A liftgate, comprising:
   (a) a unitary frame having an opposing pair of side plates, a trunnion tube extending and an extension plate extending between the side plates, wherein the side plates are adapted to secure the unitary frame to an underside of a vehicle body;
   (b) a lift frame having:
      an opposing pair of parallelogram linkages each having an upper arm, a lower arm, a proximal pivot member secured to the trunnion tube, and a distal pivot member; and
      a lift frame tube extending between the lower arms of the parallelogram linkages;
   (c) a liftgate platform rotatably attached to the distal pivot members and supported at one end only;
   (d) a stop mounted on each parallelogram linkage adjacent the distal pivot member and configured to prevent rotation of the liftgate platform away from the upper and lower arms past a generally horizontal orientation parallel with a bed of the vehicle body and configured to allow rotation of the liftgate platform toward the upper and lower arms to a generally vertical position perpendicular with the bed of the vehicle body when in a lowered position; and
   (e) an extendable actuator pivotally secured at one end to the trunnion tube and at another end to the lift frame tube;
   wherein:
      before being secured to the underside of the vehicle body, the unitary frame, the lift frame the liftgate platform, and the extendable actuator forms a freestanding assembly with the liftgate platform in a stowed position; and when the liftgate platform is rotated to a horizontal orientation, extension of the actuator raises the liftgate platform from a lowered position to a raised position while maintaining the horizontal orientation, and when the liftgate platform is rotated to a vertical orientation, extension of the actuator raises and inverts the liftgate platform into the stowed position.

2. The liftgate of claim 1, wherein the side plates are secured to at least one sub-structure cross member of the vehicle body.

3. The liftgate of claim 1, wherein the extension plate is secured to at least one horizontal frame member of the vehicle body.

4. The liftgate of claim 1, wherein the side plates and the extension plate are secured to the vehicle body by bolts or welding.

5. The liftgate of claim 1, wherein the extendable actuator is a hydraulic cylinder.

6. A cantilever liftgate for use with a vehicle having a bed, comprising:

(a) a unitary frame having an opposing pair of side plates, a trunnion tube and an extension plate extending between the side plates, wherein the side plates are secured to an underside structure of the vehicle bed;

(b) a lift frame having an opposing pair of parallelogram linkages, each having an upper and a lower arm and a proximal pivot and a distal pivot member, and a lift frame tube extending between the lower arms, wherein the proximal pivot members are secured to the trunnion tube;

(c) a liftgate platform rotatably attached to the distal pivot members;

(d) a stop configured mounted on each parallelogram linkage adjacent the distal pivot member to prevent a rotation of the liftgate platform away from the upper and lower arms past a first orientation substantially parallel with the vehicle bed and allowing a rotation of the liftgate platform toward the upper and lower arms to a second orientation substantially perpendicular to the vehicle bed;

(e) an extendable actuator pivotally secured at one end to the trunnion tube and at another end to the lift frame tube, an extension of the actuator raising the liftgate platform in the first orientation to a raised position and inverting the liftgate platform in the second orientation into a stowed position; and before being secured to the underside structure of the vehicle bed, the unitary frame, the lift frame, the liftgate platform, and the extendable actuator forms a freestanding liftgate assembly with the liftgate platform in the stowed position.

7. The cantilever liftgate of claim 6, wherein the side plates are secured to at least one underside sub-structure cross member of the vehicle bed.

8. The cantilever liftgate of claim 6, wherein the extension plate is secured to at least one horizontal frame member of the vehicle bed.

9. The cantilever liftgate of claim 6, wherein the side plates and the extension plate are secured to the vehicle bed by bolts or welding.

10. The cantilever liftgate of claim 6, wherein the extendable actuator includes a hydraulic cylinder.

* * * * *